US006692596B2

(12) United States Patent
Moll et al.

(10) Patent No.: US 6,692,596 B2
(45) Date of Patent: Feb. 17, 2004

(54) MICRO-TITER PLATE AND METHOD OF MAKING SAME

(75) Inventors: Karl-Andreas Moll, Kaarst (DE); Roland Beck, Moenchengladbach (DE)

(73) Assignee: 3M Innovative Properties Company, St. Paul, MN (US)

( * ) Notice: Subject to any disclaimer, the term of this patent is extended or adjusted under 35 U.S.C. 154(b) by 71 days.

(21) Appl. No.: 10/148,220

(22) PCT Filed: Dec. 12, 2000

(86) PCT No.: PCT/US00/35092

§ 371 (c)(1),
(2), (4) Date: May 23, 2002

(87) PCT Pub. No.: WO01/45844

PCT Pub. Date: Jun. 28, 2001

(65) Prior Publication Data

US 2003/0080454 A1 May 1, 2003

(30) Foreign Application Priority Data

Dec. 23, 1999 (EP) ........................................... 99204505

(51) Int. Cl.[7] ................................................ B32B 31/16

(52) U.S. Cl. ................ 156/73.1; 156/308.4; 156/309.6; 210/321.75; 422/101

(58) Field of Search ............................. 156/73.1, 308.2, 156/308.4, 309.6, 580.1, 580.2; 422/101, 104; 210/321.75

(56) References Cited

U.S. PATENT DOCUMENTS

| | | | |
|---|---|---|---|
| 3,540,856 A | | 11/1970 | Rochte et al. |
| 3,540,857 A | | 11/1970 | Martin |
| 3,540,858 A | | 11/1970 | Rochte et al. |
| 4,304,865 A | | 12/1981 | O'Brien et al. |
| 4,699,717 A | | 10/1987 | Riesner et al. |
| 4,801,381 A | | 1/1989 | Niesen |
| 4,948,442 A | | 8/1990 | Manns |
| 4,948,564 A | | 8/1990 | Root et al. |
| 5,264,184 A | | 11/1993 | Aysta et al. |
| 5,464,541 A | | 11/1995 | Aysta et al. |
| 5,620,663 A | | 4/1997 | Aysta et al. |
| 5,721,136 A | * | 2/1998 | Finney et al. ............ 435/287.2 |
| 6,419,827 B1 | * | 7/2002 | Sandell et al. ......... 210/321.75 |
| 6,455,007 B1 | * | 9/2002 | Mansky et al. ............. 422/101 |

FOREIGN PATENT DOCUMENTS

| | | |
|---|---|---|
| EP | 98 534 | 9/1986 |
| EP | 645 187 | 3/1995 |
| WO | WO 95/22406 | 8/1995 |
| WO | WO 97/41955 | 11/1997 |
| WO | WO 98/55233 | 12/1998 |
| WO | WO 00/25922 | 5/2000 |

* cited by examiner

*Primary Examiner*—James Sells
(74) *Attorney, Agent, or Firm*—Gary L. Griswold; Robert W. Sprague; William J. Bond

(57) ABSTRACT

The present invention provides a method of manufacturing a micro-titer test plate, said method comprising the steps of: (a) providing a first and second part, said first part comprising a plurality of wells connected to each other and said second part comprising a plurality of spouts connected to each other, said spouts conforming in arrangement and number to said wells of said first part; (b) placing a filter sheet that extents across each of said wells of said first or placing a filter sheet that extends across each of said sprouts of said second part; (c) separating from said filter sheet filter means that conform in shape, size, arrangement and number to either the bottom opening of the wells of said first part or, to said upper openings provided at the first end of the spouts; (d) placing said filter means in each of the bottom openings of the wells or in each of said upper openings provided at the first end of the spouts; (e) removing the remainder of said filter sheet from which the filter means have been separated; (f) bringing said first part and said second part in contact with each other such that the bottom opening of said wells face the first end of said spouts; and (g) bonding said first part and said second part to each other.

10 Claims, 10 Drawing Sheets

3/10

8/10

MICRO-TITER PLATE AND METHOD OF MAKING SAME

FIELD OF THE INVENTION

The present invention relates to a method for producing a micro-titer test plate. Further, this invention relates to a particular micro-titer test plate that can be produced in connection with the method of the present invention.

BACKGROUND OF THE INVENTION

Multi-well test plates, also called micro-titer plates or micro-titer test plates, are well-known and frequently used for assays involving biological or biochemical materials. Micro-titer test plates have been described in numerous patents including U.S. Pat. Nos. 4,948,442, 3,540,856, 3,540,857, 3,540,858, 4,304,865, 4,948,564, 5,620,663, 5,464,541, 5,264,184, WO 97/41955, WO 95/22406, EP 645 187 and EP 98 534.

Selected wells in the micro-titer test plate can be used to incubate respective microcultures or to separate biological or biochemical material followed by further processing to harvest the material. Each well has filtration means so that, upon application of a vacuum to one side of the plate, fluid in each well is expressed through the filter leaving solids, such as bacteria and the like, entrapped in the well. The filtration means can also act as a membrane such that certain materials in the test specimen are selectively bonded or otherwise retained in the filter means. The retained material may thereafter be harvested by means of a further solvent. The liquid expressed from the individual wells through the filter means may be collected in a common collecting vessel in case the liquid is not needed for further processing or alternatively, the liquid from the individual wells may be collected in individual collecting containers as disclosed in U.S. Pat. No. 5,464,541 and EP 98 534.

Up until recently, micro-titer plates have been used that conform to a standardized size of 85.47 by 127.76 mm having 12 rows of 8 wells each. Many expensive automation equipment has been designed to this standard. However, there is now a desire to increase the productivity of such automatic sampling. Such should preferably be accomplished in the most cost effective way and it has been proposed to retain approximately the size of the micro-titer plates yet increasing the number of wells therein. This would require minimal changes in the automation equipment.

Various methods are known to produce a micro-titer plate. These methods are typically designed to produce the standard micro-titer plates having 96 wells. For example, such plates may be manufactured as multi-layer structures including a single sheet of filter material disposed to cover the bottom apertures of all the wells, the filtration material being bonded to the periphery of one or more of the well apertures. Such a structure may suffer from a problem called "cross-talk" by which fluid from adjacent wells mingles through for example capillary action, gravity or application of pressure.

As disclosed in U.S. Pat. No. 4,304,865, a micro-titer, multi-layer plate includes a substantially rigid culture tray provided with wells having upstanding edges or rims bondeding the wider openings to the wells, and incubation is achieved while the culture tray is held "upside-down", i.e. the rims are disposed below the sheet. To harvest material from such wells, a sheet of filter paper is placed over the top of a substantially rigid harvester tray having a like plurality of wells, each disposed and dimensioned to provide a tight push-fit with respect to the periphery of the rim of a corresponding well in the culture tray. The latter is then pressed against the harvester tray to push the rims into the wells in the latter, thereby die-cutting filter discs from the filter tray. Such die-cutting may also be carried out by pressing an unused culture tray against the harvester tray. The harvester tray with the filter discs may then be pressed against the culture tray bearing the incubated material. A vacuum applied to the bottom surface of the harvester tray draws fluid from the culture tray wells through the respective filter discs. This technique of cutting the filter sheet while it overlays the wells has the disadvantage that dust formed during the cutting operation gets entrapped between the walls of the well and the filter medium which may cause poor separation performance. Such a micro-titer plate is also taught to be prone to "cross talk" according to U.S. Pat. No. 4,948,442.

Accordingly, the latter U.S. patent proposes a method of manufacturing in which the wells of a culture tray and harvester tray are welded together with there between a filter sheet which extends across the openings of the wells. However, this method still does not completely solve the problem of cross talk. In particular, welding of the wells may not be sufficient to avoid capillary action to cause mingling of fluids from adjacent wells. Moreover, this problem will be even more enhanced with micro-titer plates that have a high number of wells per unit area.

It could also be contemplated to produce the micro-titer plate by providing an array of wells connected to each other having opposite inlet and outlet openings, separately die cutting filter means conforming to the opening of the wells from a filter sheet and then inserting the filter means into the individual wells of the micro-titer plate. This method however would have the disadvantage of being difficult to automate as the handling of the individual filter means would be complicated and cumbersome thus requiring sophisticated and expensive equipment. Moreover, the degree of complexity and risk of failure during production would substantially increase when the amount of wells per area increases.

Accordingly, it is desirable to find a further method for producing micro-titer plates, which method is preferably convenient, cost effective, capable of producing micro-titer plates that have a high number of wells per unit area and which micro-titer plates preferably have a reduced problem of cross-talk and good separation performance.

DISCLOSURE OF THE INVENTION

In accordance with the method of the present invention, a micro-titer test plate having a plurality of sample containers connected to each other. Each sample container has one or more side walls enclosing the interior of said sample container, a bottom wall with an outlet opening and an opposite upper end that is open and defines an inlet opening. The micro-titer plate is produced from a first and a second part. The first part will have a plurality of wells connected to each other and the second part has a conforming number and arrangement of a plurality of spouts connected to each other. Each of the wells of the first part has one or more side walls enclosing the interior of the wells and each of the wells has an upper end that is open and that will define the inlet opening of the sample containers and an opposite bottom opening. At their bottom opening, each of the wells will be bonded to the second part. Typically, the wells will be tubular but they may also have a cross-section of a different shape parallel to the plane of the bottom openings. Further, the size of the cross-section in the axial direction of the wells may vary.

Each of the spouts of the second part encloses at its first end an opening that will define the outlet opening of a sample container once the two parts have been bonded together to form the micro-titer plate. The first end of the spout will also define the bottom wall of the sample container. Opposite to the first end, the second end is defined by the free end of the spout. In accordance with a particular embodiment in connection with the present invention, the spouts may be provided at their first end with one or more walls enclosing an upper opening that is adapted for receiving the filter means. These walls extend in the axial direction away from the second end of the spouts. In a preferred embodiment in connection with the present invention, the spouts taper towards their second end and they may be surrounded by a collar, co-axially extending from the first end.

The first and second part will generally be formed from a thermoplastic material and can be produced by injection molding. Typically thermoplastic materials that can be used include polystyrenes, polyvinyl chloride (including homo and copolymers thereof), polyethylenes and polyvinylidene chloride.

A filter sheet is placed on the side of the first part such that the filter sheet extends across each of the wells of the first part. Preferably, the sheet is placed on the side of the first part that has the bottom openings of the wells. If the second part has upper openings adapted to receive filter means at the first end of the spouts, the filter sheet may be placed on this side of the second part and will then extend across each of the upper openings. The filter sheet may be placed such as to directly overlay the openings of the wells or upper openings of the second part, but preferably, a die cut plate is provided between the filter sheet and the openings of the wells or the upper openings of the second part. Such a die cut plate will have openings conforming to the shape and size of the desired filter means and the die cut plate will be placed in register with the openings of the wells or the upper openings of the second part. A cutting stem may then penetrate the openings of the die cut plate thereby cutting the filter means out of the filter sheet. The cutting stem may then also push the filter means in the openings of the wells or the upper openings of the second part. When the filter means have been placed in the openings of the wells, the filter means will abut along their periphery the inner surface of the one or more side walls enclosing the interior of the wells. When the filter means are placed in the upper openings of the second part, the filter means will preferably abut along their periphery the inner surface of the side walls enclosing the upper opening as well as the first end of the spouts. It is also possible to cut the filter means out of the filter sheet by means of other cutting techniques such as laser cutting and cutting by means of water jets or by providing sharp edges circumscribing the bottom opening of the wells of the first part or circumscribing the upper opening adapted for receiving filter means of the spouts of the second part. In these cases, a die cut plate will not be necessary and the filter means will be cut out while overlying the wells or spouts and they are thereafter pressed into the bottom openings of the wells or if provided, in the upper openings on the first end of the spouts.

By the terms "filter means" and "filter sheet" in connection with this invention are meant any means or sheet that can cause separation of one or more components from a mixture of components. For example, the terms "filter means" and "filter sheet" include sheets that can separate a solid component from the liquid in a dispersion as well as a membrane or sheet which can separate components which may be dissolved by selectively binding them. The filter means of the present invention for example are means that allow selective adsorption, in particular of nucleic acids and proteins from liquids containing complete plant, animal or human cells or parts thereof. The filter sheet and filter means in connection with the present invention may be single layer sheets or means but they are preferably laminates comprising several layers. For example, according to a particular embodiment, the filter sheet and filter means can be a laminate of a pre-filter layer, a solid phase extraction medium preferably in the form of a membrane and a porous support layer. The filter means of the present invention will typically have a rigidity such that they will not substantially deform and substantially stay in place while being used so as to be capable of performing its separation function in the micro titer test plate.

In accordance with a particular embodiment in connection with the present invention, the plurality of filter means will be preformed in the filter sheet. By the term "preformed in the filter sheet" is meant that the shape and size of the plurality of filter means is substantially formed in the filter sheet but wherein the filter means continue to be held within the filter sheet such that they do not accidentally separate from the filter sheet during its handling. Preforming of the filter means can be carried out by partially cutting out the filter means from the filter sheet prior to placing the filter sheet on one side of the first or second part. Such partial cutting may be carried out by any cutting means known to those skilled in the art including, cutting by means of knifes, laser or water jets. The filter means are cut out in such a way that the filter means stay connected to the filter sheet at one or more points on their periphery. By the term "stay connected at one or more points on the periphery" is meant that the major part of the periphery of the filter means is cut out and only a small portion on the periphery is not cut. At the minimum, the portion of the periphery that is not cut should be sufficient to retain the filter means in the filter sheet during further handling in the manufacturing of the micro-titer plate. Typically, it will suffice to have the filter means connected at 1, 2, 3 or 4 points on their periphery. Such points of connection will typically have a size of 0.1 mm to 2 mm.

According to an alternative embodiment, the filter sheet is a laminate of a prefilter layer and a porous support layer with a solid phase extraction medium there between. The filter means can then be preformed in the filter sheet by ultrasonically welding the prefilter layer and the porous support layer together at the periphery of the filter means. Preferably, the prefilter layer and porous support layer are welded together at the complete periphery of the filter means. Accordingly, the preformed filter means will then be comprised of the solid phase extraction medium that is enclosed by the prefilter layer and porous support layer that are welded together. Such preformed filter means can be subsequently separated from the filter sheet when overlaying the array of sample containers by punching the preformed filter means out of the filter sheet without substantial dust formation. However, dust formation during the separation of the filter means from the filter sheet may be further reduced by also partially cutting the preformed filter means at their periphery where the prefilter layer and support layer are welded together. The additional partial cutting can be carried out as described above.

The internal solid phase extraction medium (SPE) can be in a variety of forms, such as fibers, particulate material, a membrane, other porous material having a high surface area, or combinations thereof. Preferably, the SPE medium is in the form of a membrane that includes a fibril matrix and sorptive particles enmeshed therein. The fibril matrix is typically an open-structured entangled mass of microfibers. The sorptive particles typically form the active material. By "active" it is meant that the material is capable of capturing an analyte of interest and holding it either by adsorption or absorption. The fibril matrix itself may also form the active material, although typically it does not. Furthermore, the fibril matrix may also include inactive particles such as glass beads or other materials for enhanced flow rates.

The prefilter layer is a porous material that can be made of a wide variety of materials. Typically, and preferably, it is made of a nonwoven material. More preferably, it is a nonwoven web of melt blown microfibers. Such "melt blown microfibers" or simply "blown microfibers" or "BMF" are discrete, fine, discontinuous fibers prepared by extruding fluid fiber-forming material through fine orifices in a die, directing the extruded material into a high-velocity gaseous stream to attenuate it, and then solidifying and collecting the mass of fibers. In preferred embodiments, the prefilter layer includes a nonwoven web of melt blown polyolefin fibers, particularly polypropylene fibers.

The prefilter layer preferably has the following characteristics: a solidity of no greater than about 20%; a thickness of at least about 0.5 millimeters (mm); and a basis weight of at least about 70 grams per square meter ($g/m^2$). As used herein, solidity refers to the amount of solid material in a given volume and is calculated by using the relationship between weight and thickness measurements of webs. That is, solidity equals the mass of a web divided by the polymer density divided by the volume of the web and is reported as a percentage of the volume. The thickness refers to the dimension of the prefilter through which the sample of interest flows and is reported in mm. The basis weight refers to mass of the material per unit area and is reported in $g/m^2$.

The support layer can be made of a wide variety of porous materials that do not substantially hinder flow of the liquid of the sample of interest. The porous material is typically a material that is capable of protecting the solid phase extraction medium from abrasion and wear during handling and use. The material is sufficiently porous to allow the liquid sample to flow through it, although it does not allow particles that might be within the solid phase extraction medium from contaminating the sample. Preferably, the support layer is made of a nonwoven material. Typically, and preferably, the material of the prefilter and the support layer are very similar in composition (as opposed to structure), and more preferably, they are the same.

The plurality of preformed filter means conform in arrangement, number and shape to the arrangement, number and shape of the bottom openings of the wells or the optional upper openings on the second part. Furthermore, the size of the filter means will typically be such that when the filter means are placed in the bottom openings of the wells or upper openings of the second part, the periphery of the filter means will abut the inner surface of the side walls of the wells or the inner surface of the side walls forming the upper openings. When used, the filter sheet will be placed in register with the bottom openings of the wells or the upper openings of the second part and the filter means can then be separated from the filter sheet and inserted in the openings. Separation of the filter means can be caused by pressing the filter means in the sample container thereby tearing off the filter means from the remainder of the filter sheet or alternatively, the preformed filter means may be separated by cutting and subsequently or simultaneously pressing the filter means into the bottom openings of the wells or the upper openings on the second part.

In accordance with the method of the present invention, the remainder of the filter sheet from which the filter means have been separated is removed and the first and second part are then bonded together. Bonding the two parts together is carried out by bringing the first and second part together such that the bottom openings of the wells face the upper first end of the spouts of the second part. Both parts are bonded together by bonding each of the wells of the first part to each of the spouts of the second part in an irreversible and permanent way. By the term "irreversible and permanent" is meant that the two parts can no longer be separated from each other without damaging the micro-titer plate. Bonding the two parts together is further accomplished in such a way that each of the plurality of formed sample containers connected to each other, are each sealed with respect to each other. A preferred means for binding the wells to the spouts includes thermal bonding and in particular ultrasonic welding. When the wells and spouts are to be thermally bonded to each other, the bottom opening of the wells of the first part may be circumscribed with one of a groove and ridge. The first end of the spouts will then be provided with the other of the groove and ridge. Alternatively, the wells may be bonded to the spouts by mutually engaging mechanically means that snap into each other such that they cannot be disengaged without damaging the micro-titer plate formed. Still further, the wells can be glued to the spouts or they may be molded to the spouts. In the latter case, after the first and second part have been engaged with each other, a small opening would remain that circumscribes each of the sample containers near the interface between the spouts and the wells. This opening is then subsequently filled with a thermoplastic polymer via an injection molding.

Once the two parts have been bonded together, a micro-titer plate comprising sample containers connected to each other is obtained. Each of the sample containers formed has one or more side walls enclosing the interior of the sample container, an upper end that is open and defines an inlet opening and an opposite bottom wall that has an outlet opening which is enclosed by a spout. The bottom wall of the sample container with the outlet opening is formed by the first end of the spouts and the inlet opening is formed by the open upper end of the wells of the first part. The filter means abuts the bottom wall and abuts along its periphery the inner surface of the one or more side walls that enclose the interior of the sample container.

The sample containers may further contain a band enclosing an opening. This band can be inserted in each of the sample containers to press the filter means against the bottom wall of the sample container. The band abuts along its periphery, the inner surface of the side wall(s) of the sample containers. The bands generally conform to the shape of the sample container and are preferably rings when the sample containers are tubular. The bands are preferably plastic or rubbery.

However, in accordance with a preferred embodiment in connection with the present invention, the wall(s) of the wells of the first part may be provided thinner for a portion proximate to the bottom opening of the well so as to adapt the bottom opening for receiving a filter means. When such a first part with the filter means inserted in the bottom opening adapted for receiving the filter means is bonded to a second part having the spouts, the filter means will be pressed against the first end of the spouts which will form the bottom wall of the sample container.

Alternatively, the wall(s) of the wells may be thickened over a portion at a certain distance away from the bottom opening. The distance away from the bottom opening will generally be chosen such as to adapt the bottom opening for receiving a filter means such that the filter means will be pressed against the bottom of the sample container when the first and second part are bonded together.

As a further alternative, the second part may have at the first end of the spouts, upper openings adapted for receiving a filter means. In accordance with the present invention, the filter means will be cut out and placed in the upper openings of the second part such that they abut the first end of the spouts and the inner surface of the wall or walls defining the upper opening. If the size of the upper openings is elected to be somewhat larger than the size of the bottom opening of the wells of the first part, then when the first and second part are bonded together, the walls of the wells of the first part will press the filter means against the bottom wall in the sample containers of the micro-titer plate so produced.

Thus, in a particular aspect of the present invention there is also provided a micro-titer plate in which a band or similar means is not necessary to press the filter means against the bottom wall of the sample containers. A micro-titer plate according to this aspect of the invention comprises a plurality of sample containers connected to each other, each sample container having one or more side walls enclosing the interior of the sample container, an open upper wall defining an inlet opening and a bottom wall having an opening defining an outlet opening, the outlet opening connecting to a spout extending in the axial direction of the sample container, wherein the sample container contains a filter means that is in abutment with the bottom wall and side walls of the sample container and wherein one or more of the side walls of the sample container are adapted to press the filter means to the bottom walls.

Micro-titer plates produced in accordance with the present invention generally are less prone to cross-talk, are fairly convenient to produce, and have a good separation performance. With the micro-titer plates of the present invention, it is possible to perform a physical separation, a chemical separation, or a bio-polymer separation or extraction of liquids containing plant, animal or human cells, and it allows, in particular, to perform the separation of nucleic acids and/or proteins of the cells. To this effect, the liquid in the sample container penetrates a filter means having selectively adsorbing material, the liquid leaving the filter means and entering a collecting container. Preferably, the filter means having selectively adsorbing material has chromatographic properties, which can include ion exchange properties or affinity-chromatographic properties, if the filter means comprises suitable affinity ligands. A preferred filter means comprises a fibrillated polytetrafluoroethylene matrix having enmeshed therein sorptive derivatized silica particulate as are disclosed in U.S. Pat. Nos. 4,810,381 and 4,699,717, respectively. Subsequently, the collecting container is replaced by another one, and a liquid containing a solvent is applied on the filter means, which selectively removes a certain portion of the material adsorbed in the filter means so that it may enter the collecting container.

The filter means of the device of the present invention may comprise one or several layers. Preferred filter means comprise a fibrillated polytetrafluoroethylene matrix having sorptive particulate enmeshed therein, as is disclosed, for example, in U.S. Pat. No. 4,810,381. In one embodiment, the filter means may be formed by two porous fixation means, in particular frits, with particles therebetween. Preferably, the particles can be in the form of bulk material, have chromatographic properties as described before. The preferred particles are made from a material that is based on silica gel, dextran or agarose. Frits may consist of glass, polyethylene (PE) or polytetrafluoroethylene (PTFE) and have a pore size of about 0.1–250 $\mu$m, preferably about 100 $\mu$m.

The thickness of the particle layer is about 1–10 mm, preferably 2.5 mm, with a particle size of 1–300 $\mu$m, preferably 16–23 $\mu$m.

According to a further embodiment, the filter means has a support membrane in which the adsorptive particles are embedded. Since the support membrane can be rather weak and there being a possibility that it can burst when a partial vacuum is applied on it (of comparatively high pressure difference), a back-up fabric or fibrous layer can be arranged below the support membrane, which provides integrity to the support membrane on the bottom wall of the sample container and preferably consists of a non-woven polyalkylene fibrous material such as polypropylene or polyethylene.

The micro-titer plate of the present invention is not limited to the dimensions of the single parts mentioned herein. Generally, the micro-titer plate of the invention can be produced in any desired size. Nevertheless, the method of the present invention is particularly suitable for producing micro-titer plates that have a large number of sample containers per unit of area without a substantial risk of cross-talk. For example the method of the present invention can be used to make a micro-titer plate having a length between 11 and 13 cm and a width between 8 and 9 cm and having from 90 to 400 sample containers. For example, a micro-titer plate of the aforementioned dimensions and having 96 or 384 sample containers may be produced with the method of the present invention.

BRIEF DESCRIPTION OF THE DRAWINGS

The invention is further illustrated by means of reference to the following drawings that represent preferred embodiments of the invention without however the intention to limit the invention thereto.

DETAILED DESCRIPTION OF THE PREFERRED EMBODIMENTS

Figure 1:
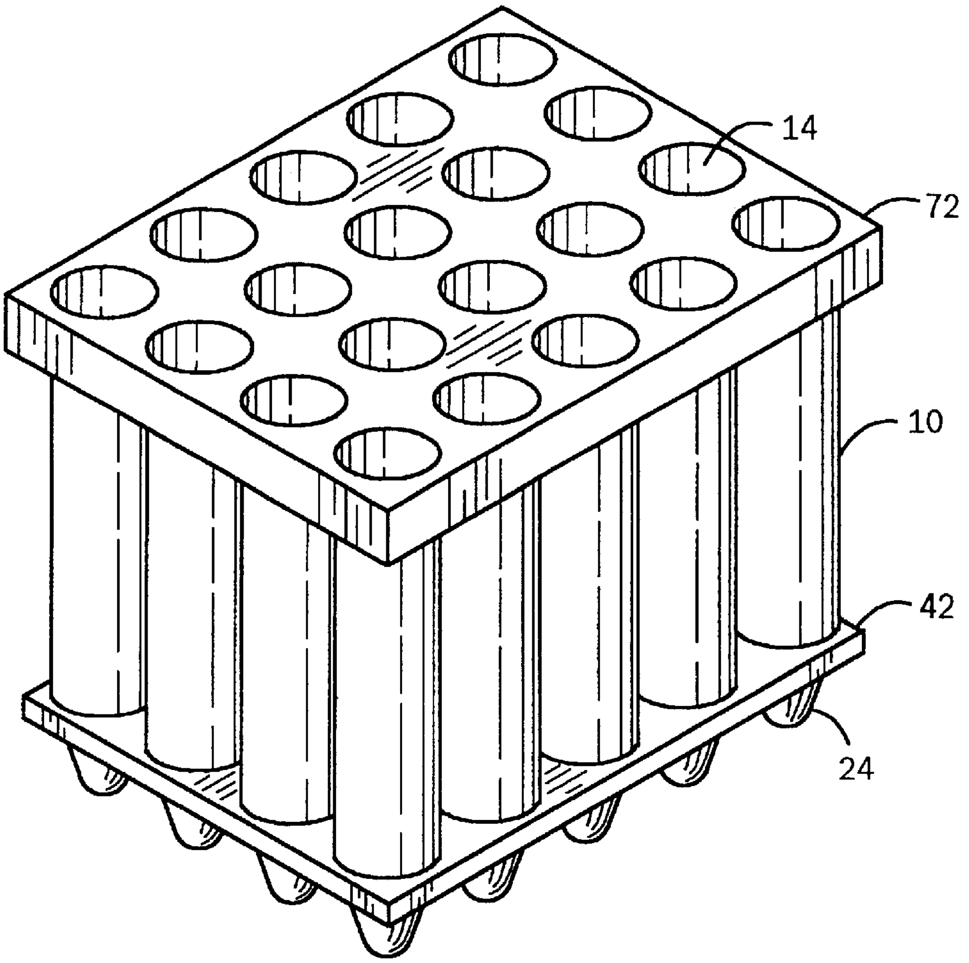
FIG. 1 shows a three dimensional view of a micro-titer test plate that can be produced in connection with the present invention.

Referring to FIG. 1, there is shown a three dimensional view of a micro-titer test plate that can be produced with the method of the present invention. The micro-titer test plate has a plurality of sample containers 10 connected to each other. As shown in FIG. 1, the sample containers are connected at the inlet openings 14 with each other by a plate

72 and near the spouts 24 by the plate 42. The micro-titer test plate of FIG. 1 is produced using a first and second part that will permanently and irreversibly be bonded to each other according to the method of the invention.

Figure 2A:
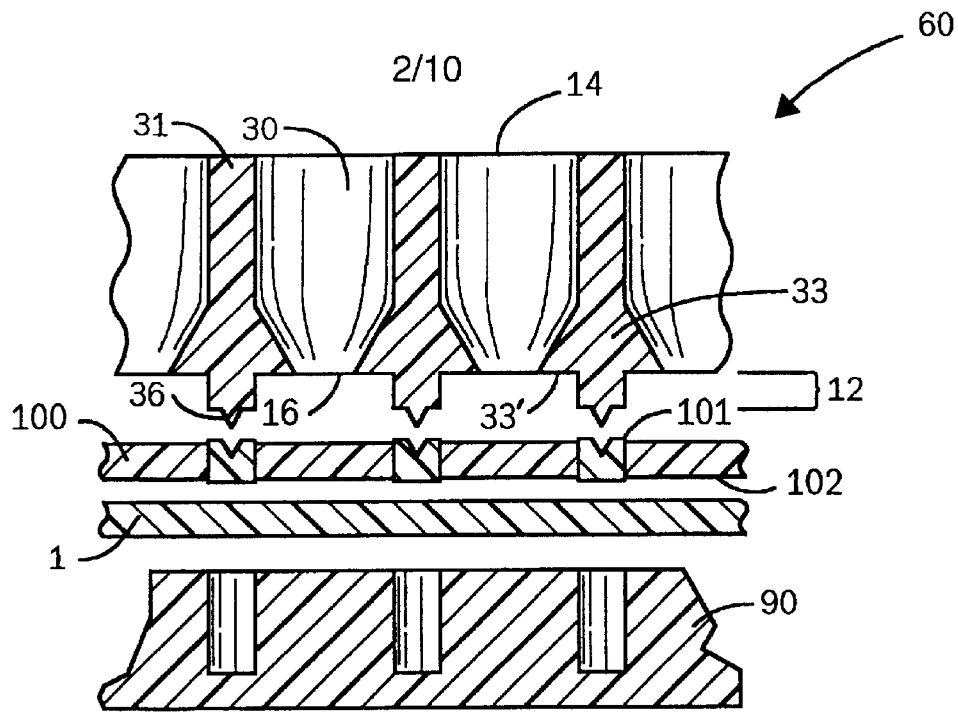
FIGS. 2*a–d* show a part of a cross-sectional view for illustrating a first embodiment of the manufacturing method of the invention.
Figure 2B:
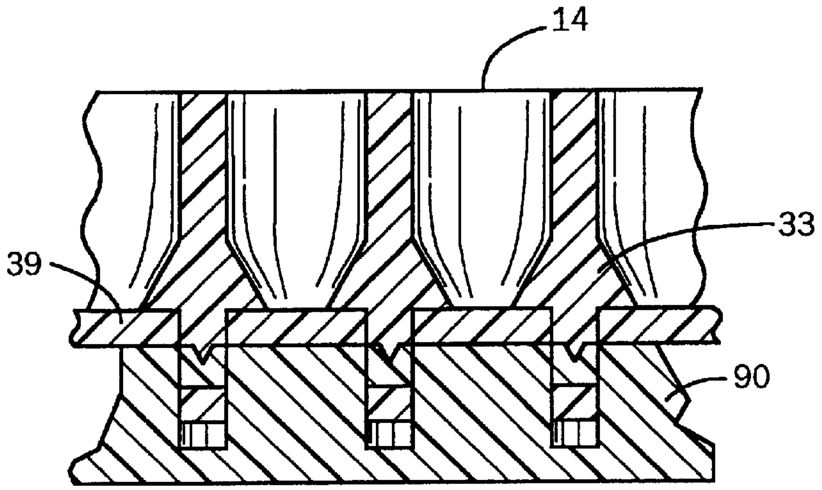
Figure 2C:
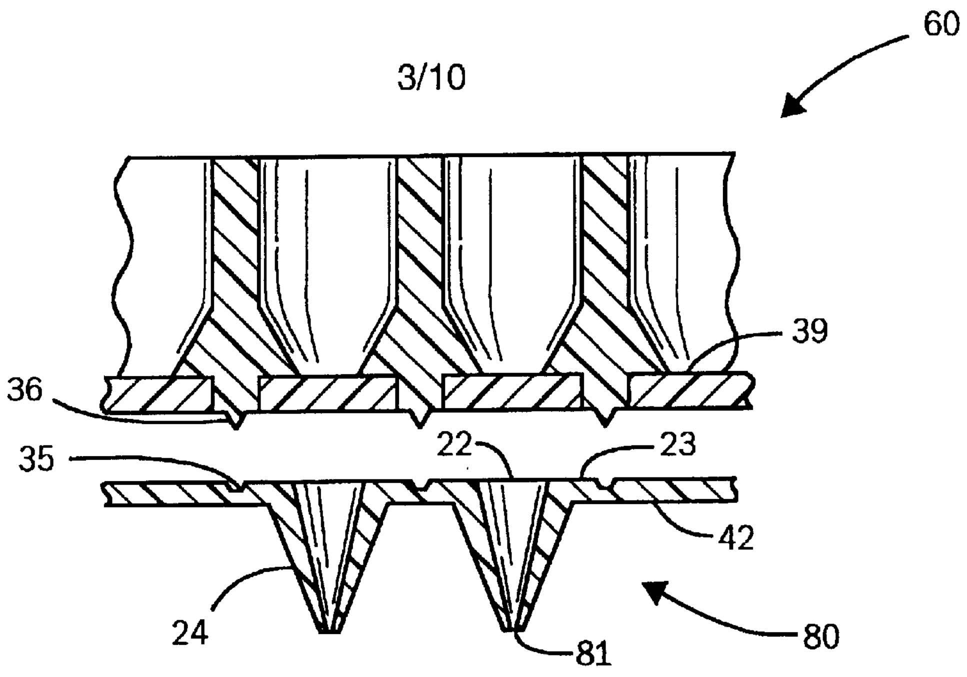
Figure 4A:
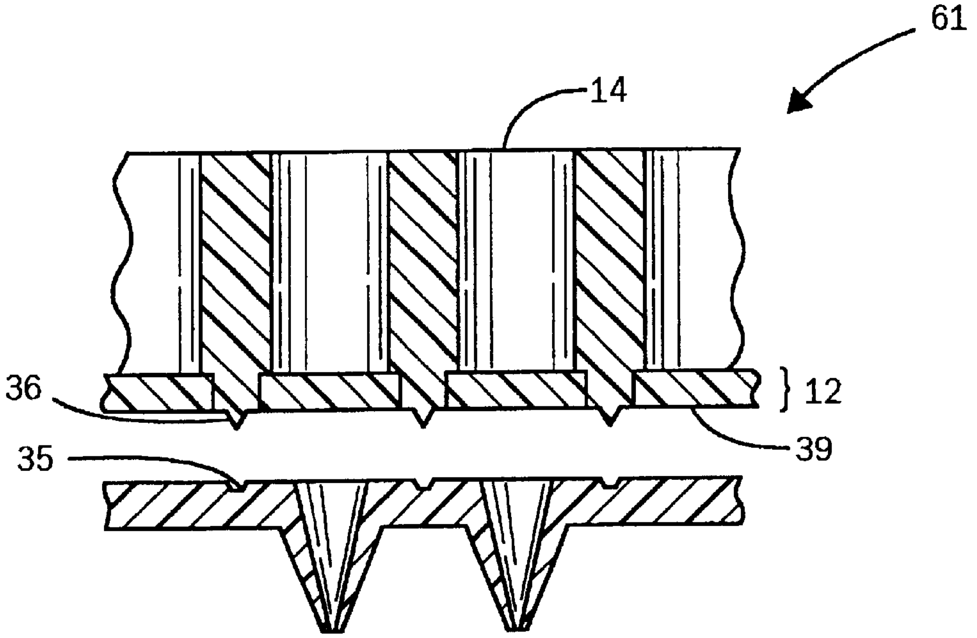
FIGS. 4*a* and 4*b* show an alternative first part for use with the embodiment of the method of the present invention illustrated in FIGS. 2*a–d.*
Figure 4B:
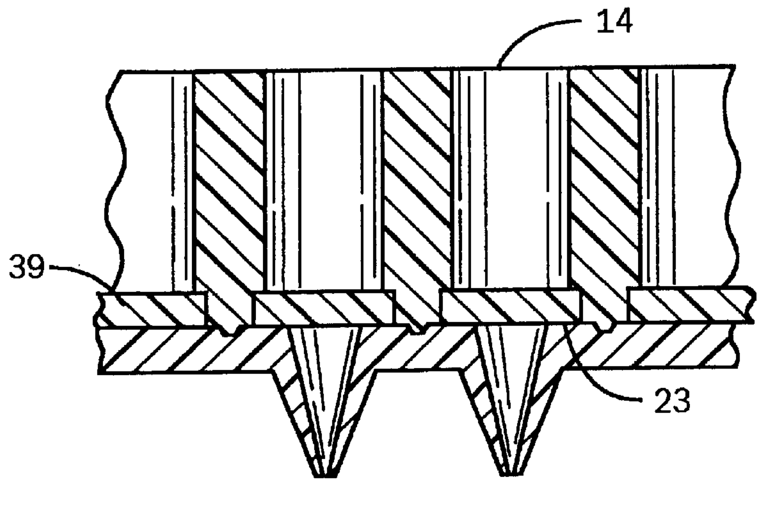

FIGS. 2*a* and 2*b* show a first embodiment of the manufacturing method of the invention. In FIG. 2*a,* there is shown a partial cross-section of a first part 60 having a plurality of wells 30 connected to each other. Each of the wells 30 has side walls 31 enclosing the interior of the wells. Each of the wells 30 has an opening which will form the inlet opening 14 of the sample container and an opposite bottom opening 16. As shown in FIG. 2*a,* the bottom opening 16 is adapted for receiving a filter means by providing thickened portions 33 having a bottom wall portion 33' on the side walls 31. The thickened portions 33 are provided at a predetermined distance 12 from the bottom opening. This predetermined distance 12 will generally be elected such that when the filter means 39 have been placed therein and the first part 60 has been bonded to the second part 80, the filter means 39 will be pressed against the first end 23 of the second part 80 which will form the bottom wall of the sample containers (see FIGS. 2*c* and 2*d*). Typically, predetermined distance 12 will correspond to or be somewhat less than the thickness of the filter means 39. As shown in FIGS. 2*a*–2*d,* the thickened portion 33 of the side walls near the bottom opening may be provided by gradually thickening the side walls towards the interior of the well from a first point downwards towards the bottom opening 16 and then at a second point abruptly reducing the thickness of the side walls, preferably to the thickness of the side walls at the first point. The second point, where the thickness is abruptly reduced forming a bottom wall portion 33' will generally be positioned at the predetermined distance 12 from the bottom opening 16 of the well. As an alternative arrangement for the first part, the side walls may have a first thickness from the inlet opening 14 towards the bottom opening and this first thickness may be reduced to a second thickness over a predetermined distance 12 at the bottom opening so as to adapt that bottom opening for receiving a filter means. This embodiment is shown in FIGS. 4*a* and 4*b*.

Figure 2D:
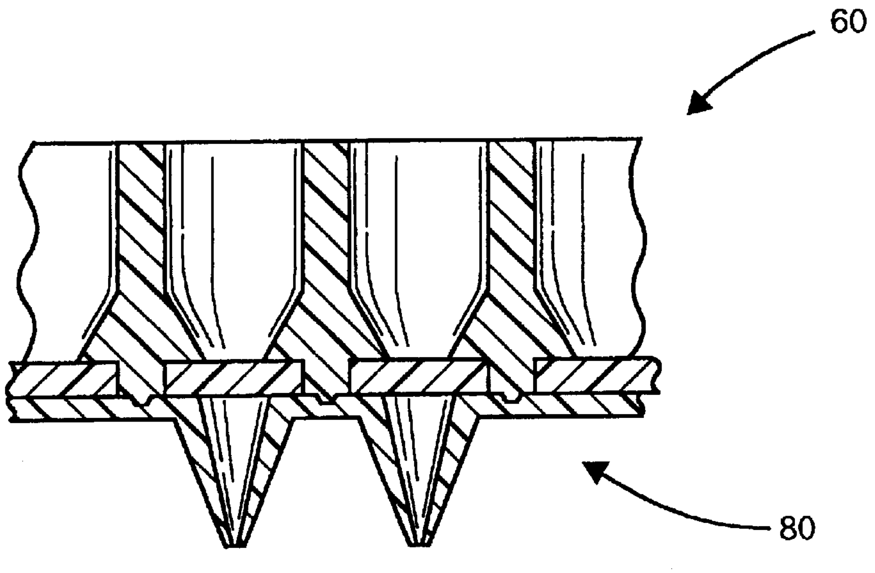

Returning now to FIG. 2*a,* there is further shown a die cut plate 100 that has openings 102 that conform in shape and size to the bottom opening 16 of the wells of the first part 60. The die cut plate further has grooves 101 that mate with corresponding ridges 36 that circumscribe the bottom opening 16. Die cut plate 100 is engaged with first part 60 whereby the ridges 36 mate with grooves 101. A filter sheet 1 is provided on the die cut plate and filter means 39 are cut out of the filter sheet 1 by a plurality of cutting stems 90 which also force the filter means 39 into the bottom opening 16 adapted for the receiving means (see FIG. 2*b*). The plurality of cutting stems 90 are then removed as well as the remainder of the filter sheet 1 and the die cut plate 100. The remainder of the filter sheet 1 will be a sheet with holes corresponding to the filter means 39 that have been cut out. A second part 80 (see FIG. 2*c*) is then provided that has a plurality of spouts 24 connected to each other that enclose an opening 22 at a first end 23. The first end 23 will form the bottom wall of the sample containers 10 (see FIG. 1) and the opening 22 will define the outlet opening of the sample containers 10. Opposite the first end is the second end 81 of the spouts 24. As can be seen, spouts 24 taper towards the second end 81. The spouts 24 are connected to each other via a plate 42. Grooves 35 are provided and circumscribe the first end 23 of the spouts 24. The first part with the filter means 39 inserted in the bottom openings 16 of the wells is placed on the second part 80 such that the bottom openings 16 face the first ends of the spouts. FIG. 2*d* shows that ridges 36 are inserted in the grooves 35 when the first part 60 and second part 80 are contacted with each other and have are bonded with the corresponding spouts on the second part 80 by ultrasonically melting the ridges 36 with the grooves 35. Accordingly, a micro-titer plate is then obtained in which the sample containers are sealed relative to each other such that there is little or no potential for cross-talk.

An alternative embodiment for producing a micro-titer plate in connection with the method of the present invention is shown in FIGS. 3*a* to 3*d.* According to this embodiment, a second part 50 having a plurality of spouts 24 connected to each other is provided. Spouts 24 each enclose an opening 22 at first ends 23. Opposite to the first end of the spouts is the second end 81. Spouts 24 taper towards second end 81. The spouts 24 are connected to each other by plate 42. Each of the spouts 24 of the second part 50 also has side walls 51 circumscribing the first end 23 and defining an upper opening 55 adapted for receiving filter means 39. The height of the side walls 51 will generally be elected such that when the second part 50 is bonded with a first part 110, the side walls of the wells of that first part 110 may press the filter means 39 against the first ends of the spouts 24 (see FIG. 3*d*) forming the bottom walls of the sample containers 10. Typically therefore, the height will be equal to or somewhat less than the thickness of the filter means 39.

Figure 3A:
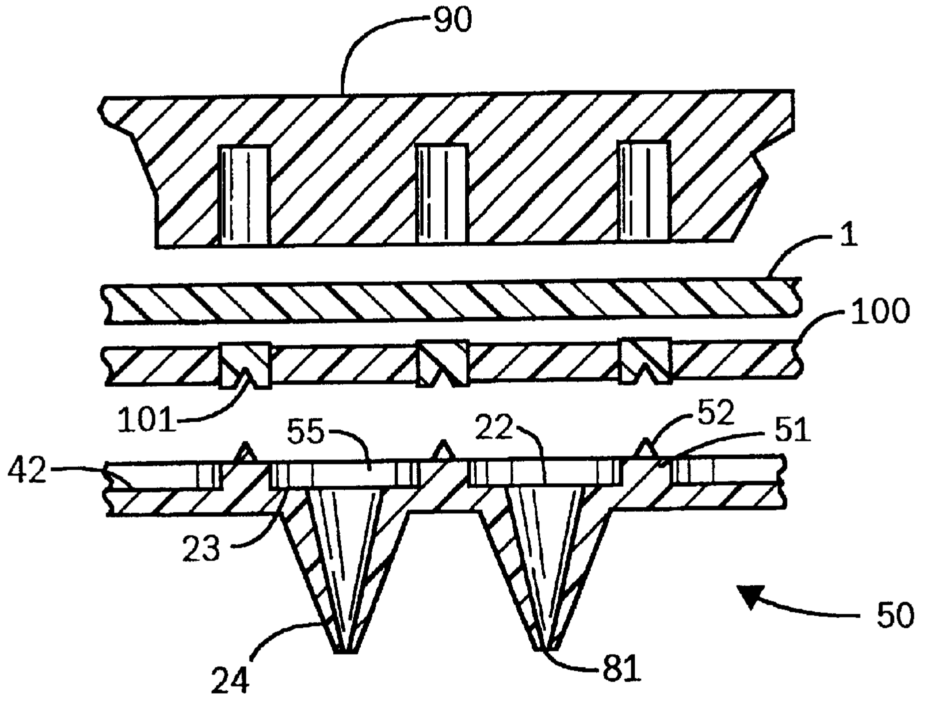
FIGS. 3*a–d* show a part of a cross-sectional view for illustrating a second embodiment of the manufacturing method of the invention.
Figure 3B:
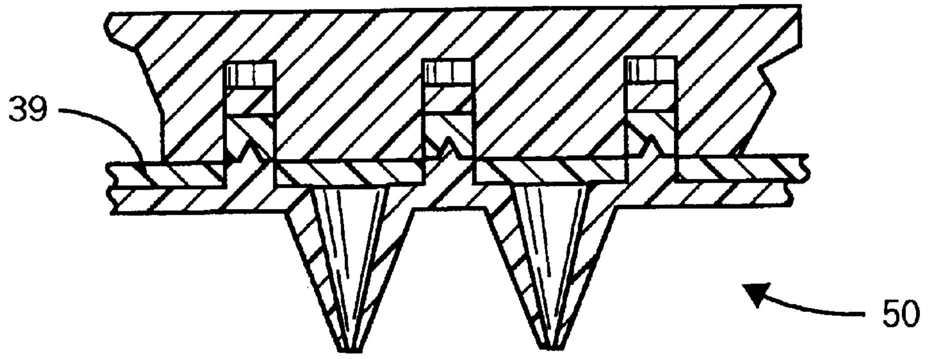
Figure 3C:
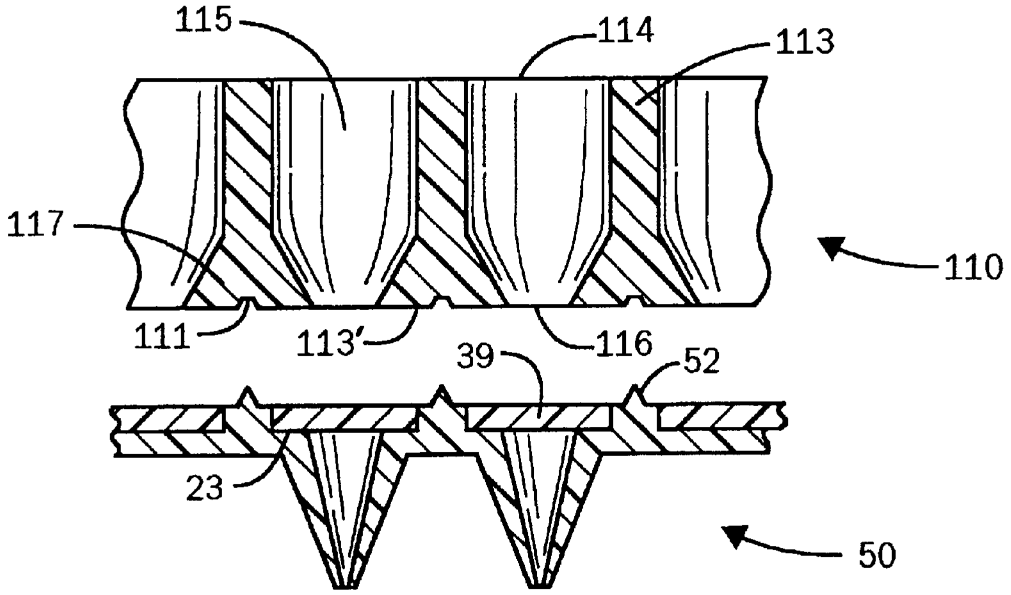
Figure 3D:
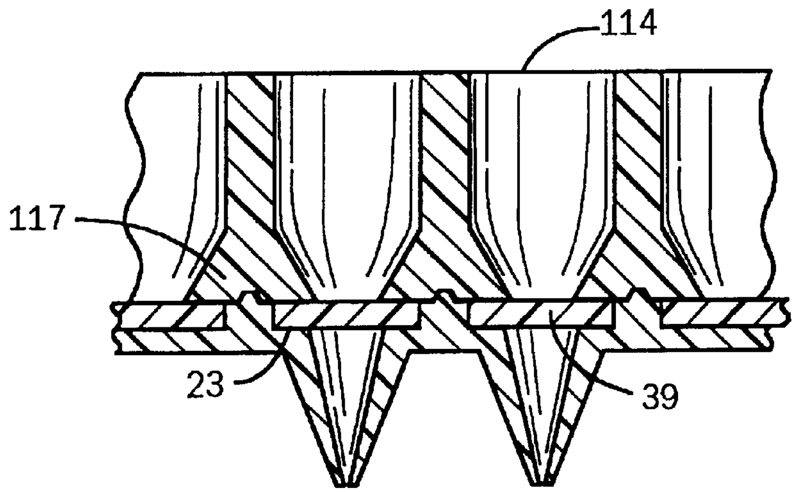

A die cut plate 100 having grooves 101 capable of mating with ridges 52 provided on the walls 51 and circumscribing the upper openings 55 is provided. The die cut plate 100 is contacted with the second part such that grooves 101 mate with ridges 52. A filter sheet 1 is placed thereon such that it extends across each of the upper openings 55 of the second part. Cutting stems 90 then cut out the filter means 39 and press them into the upper openings 55 (FIG. 3*b*). The die cut plate 100 and remainder of the filter sheet 1 are then removed and a first part 110 for bonding with the second part 50 is provided. The first part 110 as shown in FIG. 3*c* has a plurality of wells 115 connected to each other, each of which has side walls 113 defining the interior of the wells. Each of wells 115 further has at one end an opening defining an inlet opening 114 and at the opposite end an opening defining the bottom opening 116. Side walls 113 are gradually thickened at portion 117 near the bottom opening 116 such that when the first part 110 is bonded with the second part 50, the bottom wall portion 113' of side walls 113 will partially overlap with the filter means 39 so as to press the latter against first ends 23 of the spouts of the second part 50. The bottom wall portion 113' of side walls 113 are further provided with grooves 111 that circumscribe the bottom opening 16 and into which ridges 52 of the second part 50 can be inserted. Ultrasonic bonding or other thermal bonding techniques may thus permanently and irreversibly bind each of the wells of first part 110 to the corresponding spouts of second part 50 by melting ridges 52 with grooves 111.

Figure 6A:
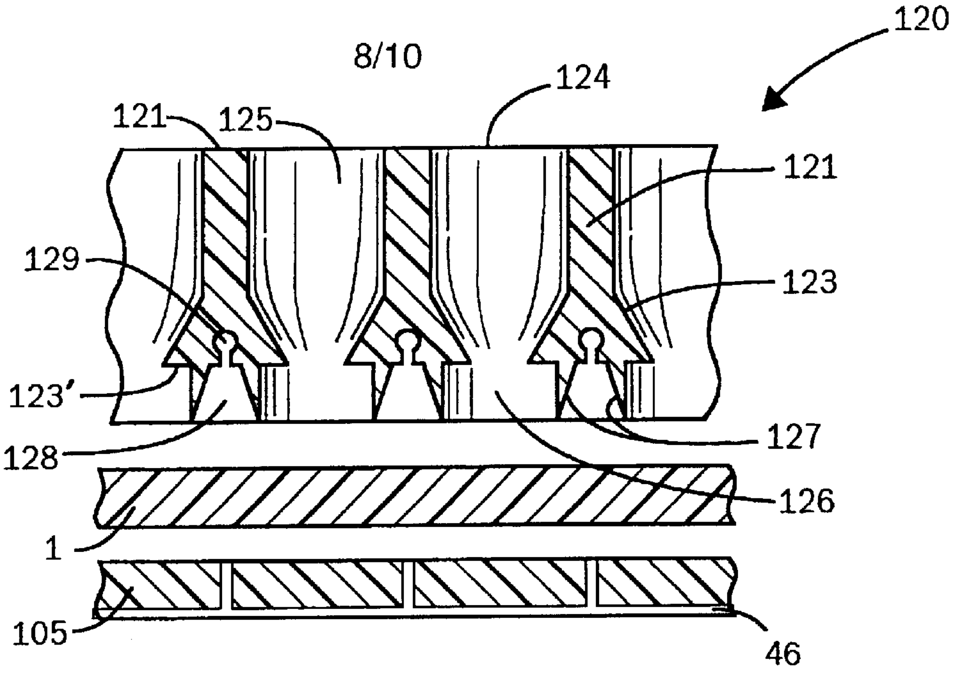
FIGS. 6*a–d* show a part of a cross-sectional view for illustrating a third embodiment of the manufacturing method of the invention.
Figure 6B:
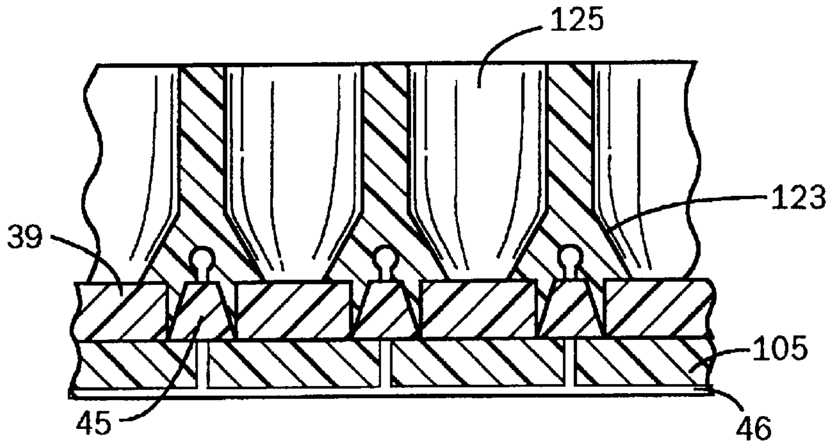

In FIGS. 6*a*–*d* there is illustrated a further embodiment of the present invention in which the first and second part are permanently and irreversibly bonded together by mutually engaging mechanical means. As shown in FIG. 6*a,* there is provided a first part 120 have a plurality of wells 125 connected to each other that each have side walls 121 enclosing the interior of the wells. At one end there is an opening defining inlet opening 124 and opposite thereof is bottom opening 126. Similarly as illustrated in FIGS. 2*a*–2*d*, the bottom opening 126 is adapted for receiving filter means 39 by providing thickened portion 123 having bottom wall portion 123' proximate to the bottom opening 126. The side walls 121 of each of the wells 125 of the first part 120 are provided with the female portion 128 of mutually engaging and interlocking mechanical means. Female portion 128 has snap-in holes 129 from which the corresponding male heads 203 (see 6*c*) cannot be withdrawn once they have been snapped into holes 129. Female portion 128 further has sharp edges that are capable of cutting through at least some filter sheets.

Figure 7:
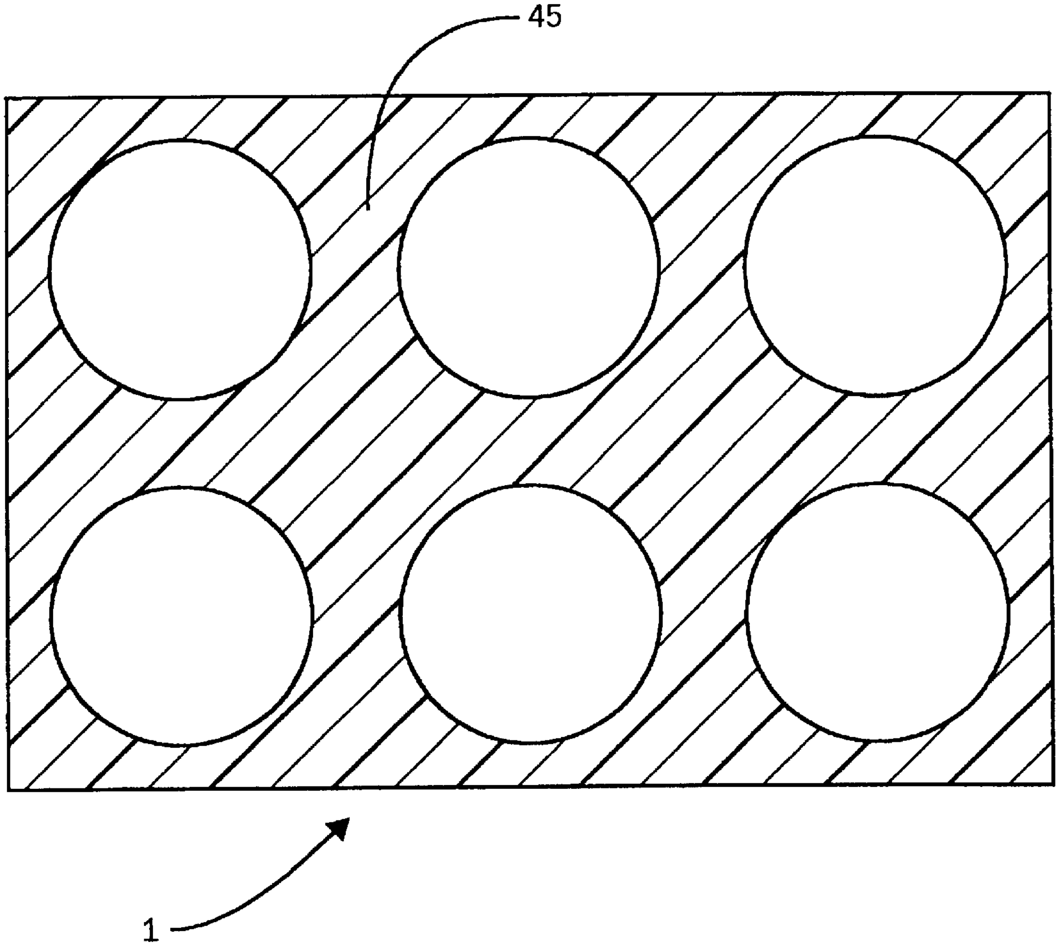
FIG. 7 shows the remainder of a filter sheet from which filter means have been separated.

To insert filter means 39 into the first part 120, a filter sheet 1 is provided on the side of the first part 120 that has the bottom openings and female portions 128 with sharp edges 127. Filter sheet 1 is provided between first part 120 and a plate 105. To place the filter means 39 into the bottom openings 126, the first part 120 is pressed onto the filter sheet 1 thereby cutting out filter means 39 and simultaneously inserting them into the bottom openings 126. As can be appreciated from FIG. 6*b,* this also results in remaining portions 45 of the filter sheet 1 to be pressed into the female portions 128. These remaining portions 45 of the filter sheet 1 can be removed from the female portions 128 by applying a vacuum to plate 105 through channels 46. By removing plate 105 while a vacuum is applied thereto, the remaining portions 45 of the filter sheet 1 will be removed from the female portions 128. As depicted in FIG. 7, the remaining portions 45 form a sheet with holes that correspond in shape, size and number to the filter means 39 that have been removed therefrom. As shown in FIG. 7, these holes are circular but they could be of a different form depending on the form of the bottom openings 126.

Figure 6C:
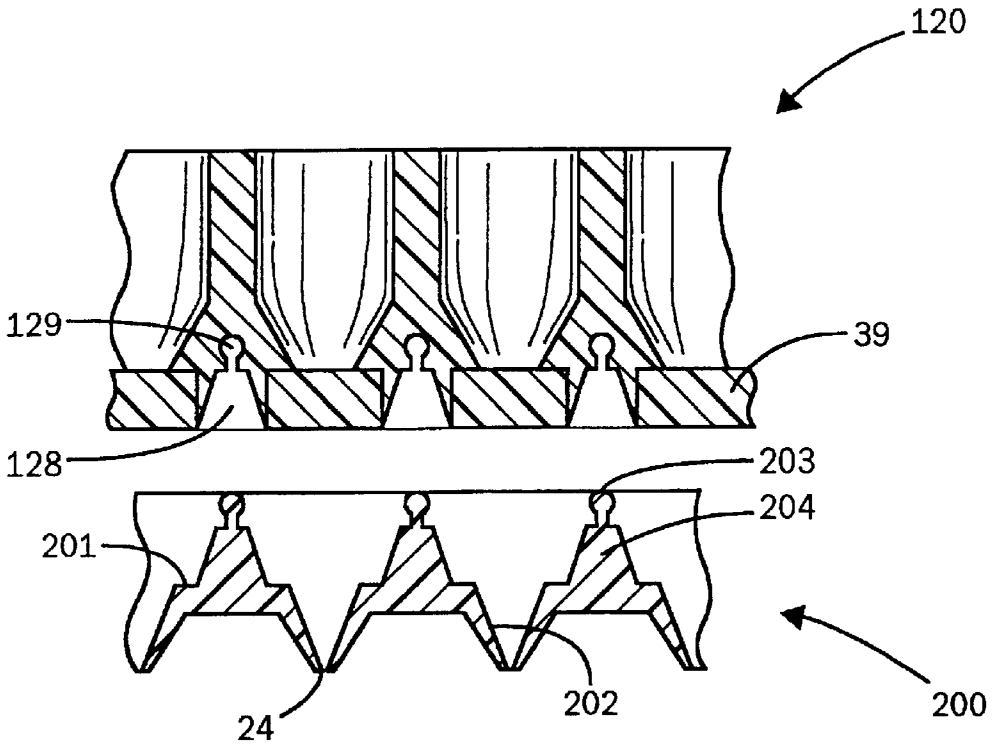
Figure 6D:
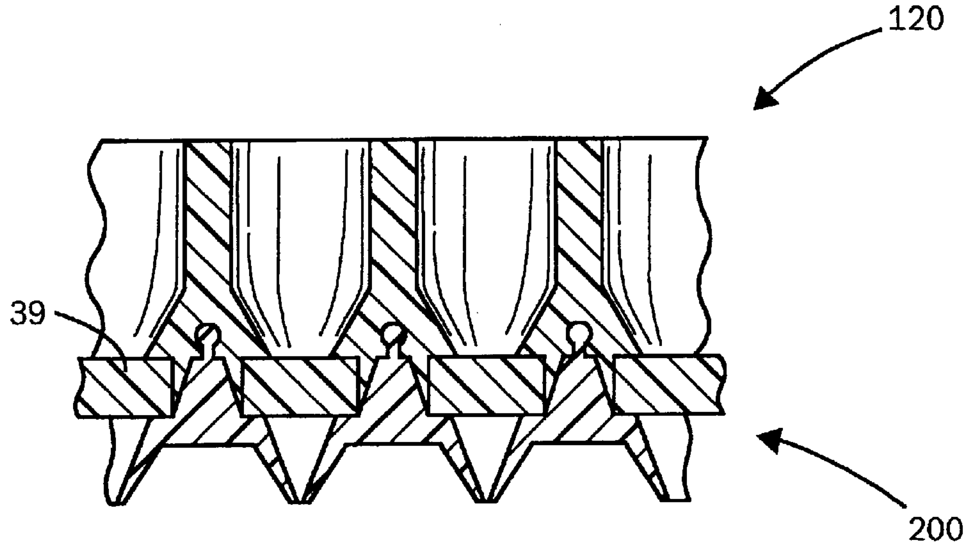

FIG. 6*c* shows the first part 120 with the filter means 39 inserted in bottom openings 126 and wherein the remaining portions 45 of the filter sheet 1 have been removed. Further shown is second part 200 for bonding with first part 120 to produce the micro-titer plate. Second part 200 has a plurality of spouts 24 connected to each other. Each spout 24 has a first end 201 that will ultimately form the bottom wall of the sample containers. The first end 201 has an outlet opening 202 that is enclosed by the spout. First ends 201 are each circumscribed by male portions 204 for engagement with female portions 128 of first part 120. To hind first part 120 to second part 200, the male portions 204 with their heads 203 are pressed into the female portions 128 and heads 203 are thereby snapped into holes 129 of the female portions 128. A micro-titer plate thus results as depicted in FIG. 6*d.* The first part 120 and second part 200 of the micro-titer plate can no longer be separated from each other because the heads 203 irreversibly lock into holes 129.

Figure 5:
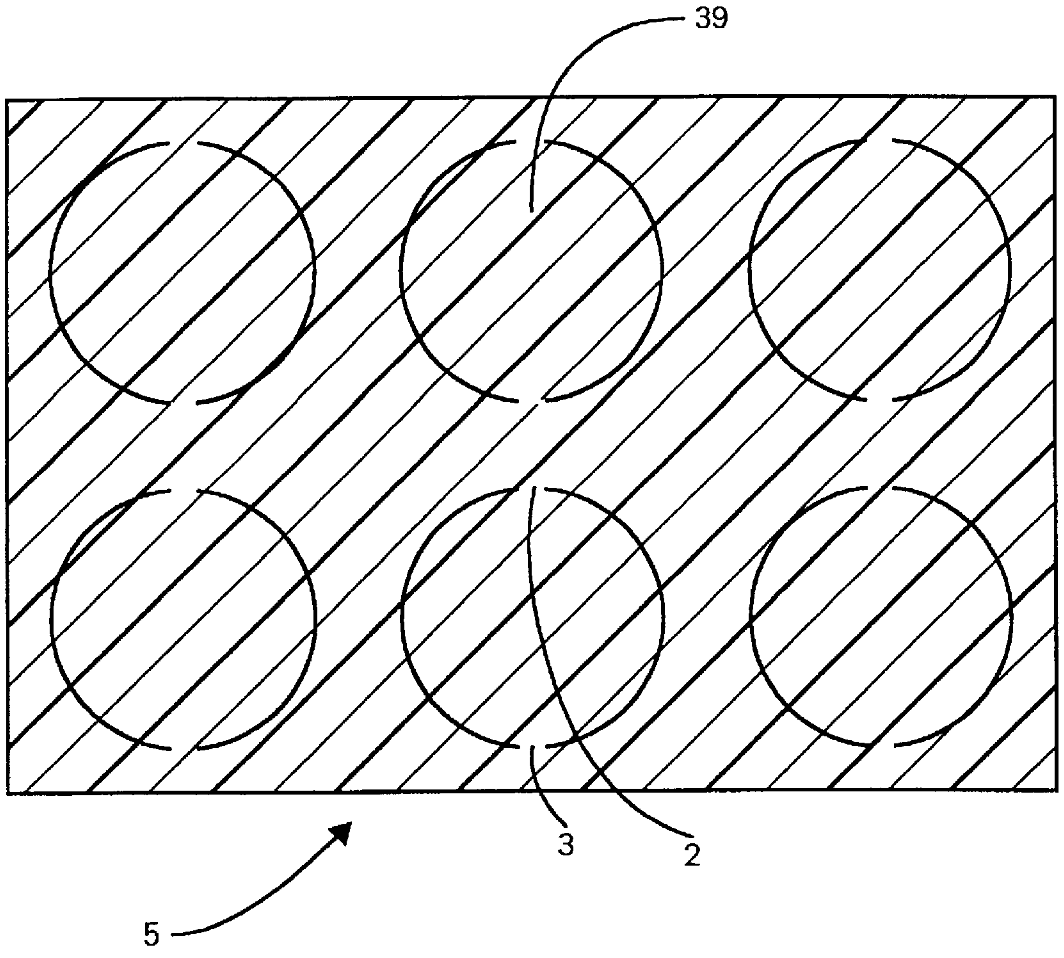
FIG. 5 shows a filter sheet with partially cut out filter means.

In connection with the embodiments described above, the cutting of the filter means out of the filter sheet 1 is carried out by using a die cutting plate 100 and cutting stems 90 or is carried out by the sharp edges 127 on the first part 120 as shown in FIGS. 6*a*–6*d.* However, as a variant of the above described embodiments, the filter sheet may contain the filter means 39 preformed therein by partially cutting them out. As shown in FIG. 5 filter means 39 are partially cut out in the filter sheet 5. A plurality of filter means 39 are partially cut out which conform in arrangement, shape and number to the plurality of bottom openings of the wells of the first part or the upper openings of the second part in which they will be inserted. FIG. 5 shows a few of such filter means 39 partially cut out in the filter sheet 5. Filter means 39 of FIG. 5 have a circular periphery to conform to a circular bottom opening of the first part or upper opening of the second part. As can be seen, filter means 39 in FIG. 5 have been cut along there periphery except for two oppositely laying points 2, 3 where the filter means 39 remain connected to the filter sheet 5. While FIG. 5 illustrates filter means 39 as circular, filter means 39 may also have a square periphery to conform to openings that have a square cross-section. If a filter sheet 5 with the filter means 39 partially cut out is used instead of filter sheet 1, it will generally not be necessary to use a die cut plate. In this instance, the filter sheet 5 will be placed on the first or second part such that the filter means 39 are in register with the openings in which they are to be placed. They can then be separated from the filter sheet by means of a plurality of stems that push the filter means 39 into the relevant opening while at the same time tearing of the filter means at the points where they were still connected to the filter sheet. This embodiment has the advantage that less dust is created when the filter means are separated from the filter sheet and accordingly there will be less risk that dust may interfere with the filter performance of the individual sample containers of the micro-titer plate produced. The use of a filter sheet 5 with filter means 39 partially cut out further presents the advantage that when one of the first or second part has been equipped with sharp edges to cut the filter sheet, cutting will be facilitated.

What is claimd is:

1. Method of manufacturing a micro-titer test plate comprising a plurality of sample containers connected to each other of which each sample container has one or more side walls enclosing the interior of said sample container, a bottom wall with an outlet opening and an opposite upper end that is open and defines an inlet opening, said method comprising the steps of:

(a) providing a first aid second part said first part comprising a plurality of wells connected to each other and each having an upper end that is open and that will define the inlet opening of said sample containers and an opposite bottom opening and said second part comprising a plurality of spouts connected to each other, said spouts conforming in arrangement and number to said wells of said first part and each spout enclosing at a first end an opening that will define the outlet opening of said sample containers, and each spout optionally having an upper opening at said first end for receiving a filter means;

(b) placing a filter sheet that extents across each of said wells of said first part on one side of said first part or placing a filter sheet that extends across each of said spouts of said second part on the side of said second part having said first ends;

(c) separating from said filter sheet filter means that conform in shape, size, arrangement and number to either the bottom opening of the wells of said first part or when present, to said optional upper openings provided at the first end of the spouts;

(d) placing said filter means in each of the bottom openings of the wells or when present in each of said upper openings provided at the first end of the spouts;

(e) removing the remainder of said filter sheet from which the filter means have been separated;

(f) bringing said first part and said second part in contact with each other such that the bottom opening of said wells face the first end of said spouts; and (g) bonding said first part and said second part to each other by permanently and irreversibly bonding each of the wells of said first part to each of the spouts of said second part thereby forming a plurality of sample containers connected to each other that are scaled with respect to each other.

2. The method according to claim 1 wherein said filter sheet has said filter means preformed therein.

3. The method according to claim 2 wherein said filter means are separated from said filter sheet by pressing said filter means into the bottom opening of each of the wells or into the upper opening provided at the first end of each of the spouts of said second part thereby tearing off the filter means from said filter sheet.

4. The method according to claim 1 wherein the bottom opening of said wells is adapted for receiving the filter means and for pressing said filter means against first end of said spouts when said first and second part have been bonded together.

5. The method according to claim 1 wherein said spouts have an upper opening at said first end for receiving a filter means and the bottom opening of said wells is smaller than the size of the filter means such that when said first and second part have been bonded together, the bottom wall portion of the side walls of the wells press said filter means against the bottom wall of said sample containers.

6. The method according to claim 1 wherein said filter means are separated from said filter sheet by cutting out said filter means.

7. The method according to claim 1 wherein the bottom opening of said wells has been provided with sharp edges and wherein said filter means are separated by pressing said first part onto said filter sheet.

8. The method according to claim 1 wherein said first and second part are permanently and irreversibly bonded together by ultrasonic welding, gluing or by mutually engaging means provided on said wells of said first part and said spouts of said second part.

9. The method according to claim 1 wherein each spout of said plurality of spouts tapers towards its second end opposite to said first end.

10. A micro-titer plate comprising a plurality of sample containers connected to each other, each sample container having one or more side walls enclosing the interior of the sample container, an open upper wall defining an inlet opening and a bottom wall having an opening defining an outlet opening, said outlet opening being enclosed by a spout extending in the axial direction of the sample container, wherein the sample container contains a filter means that is in abutment with the bottom wall and side walls of the sample container and wherein one or more of said side walls of said sample container are adapted to press said filter means to said bottom walls.

* * * * *

UNITED STATES PATENT AND TRADEMARK OFFICE

CERTIFICATE OF CORRECTION

PATENT NO. : 6,692,596 B2
DATED : February 17, 2004
INVENTOR(S) : Moll, Karl-Andreas It is certified that error appears in the above-identified patent and that said Letters Patent is hereby corrected as shown below:

Column 1,
Lines 60-61, please delete "bondeding" and insert -- bonding --.

Column 11,
Line 39, after "To", please delete "hind" and insert -- bind --.

Column 12,
Line 20, after "What is", please delete "claimd" and insert -- claimed --.
Line 27, delete "aid" and insert -- and --.
Line 27, after "second part" insert -- , --.
Line 62, after "other that are", please delete "scaled" and insert -- sealed --.

Signed and Sealed this

Twenty-fourth Day of August, 2004

JON W. DUDAS
*Director of the United States Patent and Trademark Office*